United States Patent Office 2,907,500
Patented Oct. 6, 1959

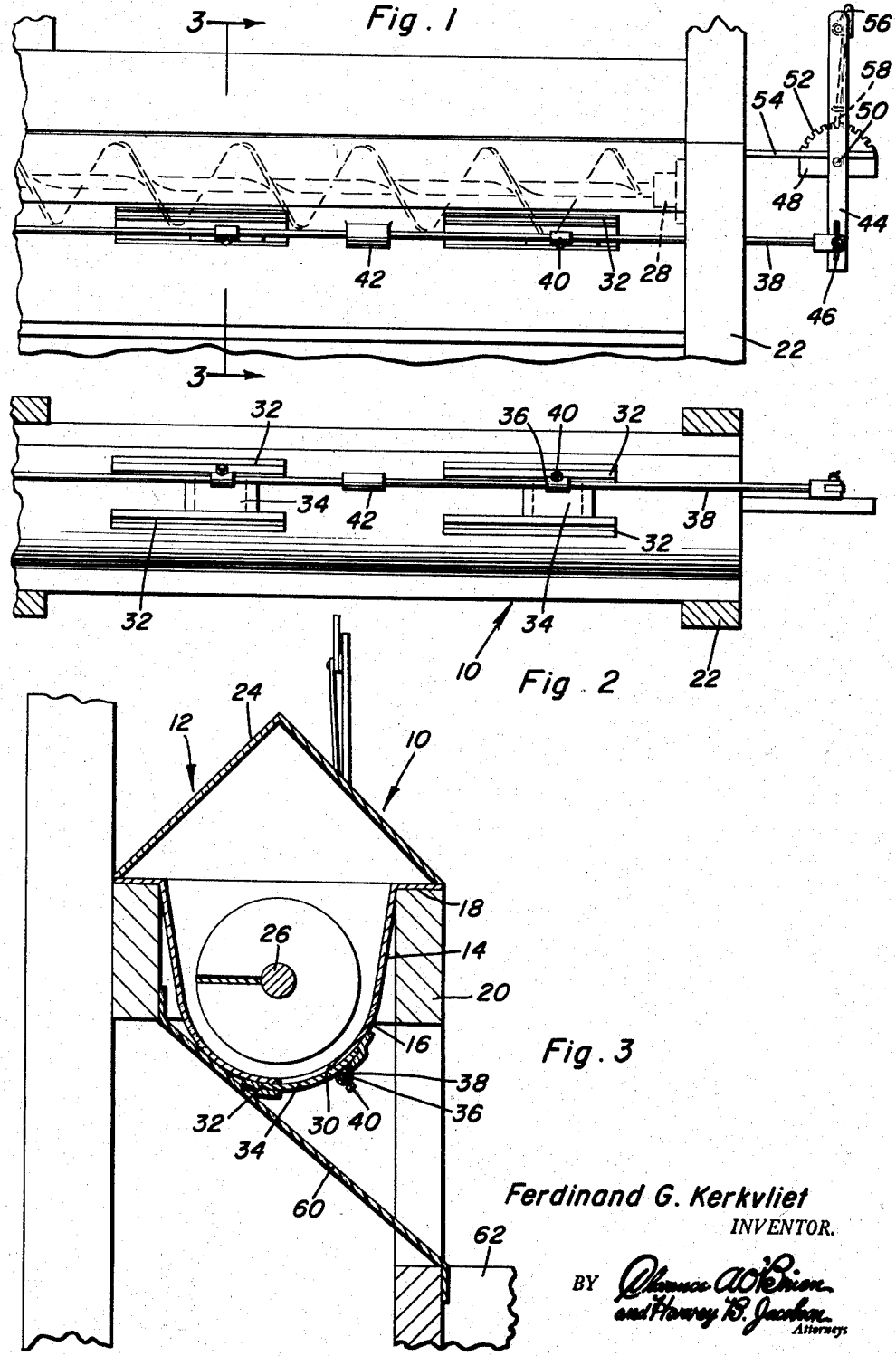

2,907,500

CONVEYOR WITH SIMULTANEOUSLY CONTROLLED DISCHARGE OPENINGS

Ferdinand G. Kerkvliet, Larchwood, Iowa

Original application April 20, 1954, Serial No. 424,411, now Patent No. 2,793,615, dated May 28, 1957. Divided and this application March 25, 1957, Serial No. 648,060

1 Claim. (Cl. 222—311)

The present invention generally relates to a conveyor and more particularly to a conveyor for conveying and distributing materials such as feed to a plurality of feeding areas along the length of a feed bunker and this application is a division of my copending application for feed bunker loader, Serial No. 424,411, filed April 20, 1954, now Patent No. 2,793,615, issued May 28, 1957.

An object of the present invention is to provide a conveyor for distributing feed in which the conveyor is provided with a screw auger disposed therein and a plurality of longitudinally spaced discharge openings provided with longitudinal sliding closure plates therefor.

Another object of the present invention is to provide a conveyor mechanism in accordance with the preceding object in which the closure plates are actuated by an elongated longitudinal rod thus providing simultaneous operation of the closure plates.

Yet another feature of the present invention is to provide a conveyor mechanism in accordance with the preceding objects in which the closure plates are individually adjustably attached to the actuating rod for varying the opening of the discharge openings by the closure plates.

Other objects of the present invention are to provide a conveyor mechanism which is simple in construction, efficient in operation, well adapted for its purposes and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view of one end of the conveyor of the present invention illustrating the actuating mechanism for the closure plates for the discharge opening;

Figure 2 is a bottom plan view of the conveyor showing the orientation of the closure plates for the discharge openings as well as the guide flanges therefor with the support members being shown in section; and Figure 3 is a transverse, sectional view taken substantially upon a plane passing along section line 3—3 of Figure 1 illustrating the construction of the conveyor housing, the screw auger conveyor and the relationship of the discharge openings to the conveyor and the conveyor housing.

Referring now specifically to the drawing, the numeral 10 generally designates the conveyor mechanism of the present invention which includes a longitudinally elongated housing generally designated by numeral 12 which may be of any suitable construction but is shown as including an elongated trough 14 having a cylindrical lower portion 16 and outwardly extending flanges 18 at the upper edges thereof. The outwardly extending flanges 18 are supported on longitudinal support members 20 which in turn are supported by vertical standards or other support means 22. An inverted V-shaped roof 24 forms a closure for the trough 14 for preventing entry of water, snow or the like and also for preventing animals from gaining access to the material being conveyed. The trough 14 and roof 24 cooperate to form a hollow housing and it is pointed out that the particular shape of the housing may be varied as desired with the cylindrical portion 16 receiving an elongated screw auger 26 with the screw auger 26 being supported at its ends for rotation by any suitable bearings 28.

The cylindrical portion 16 of the trough 14 is provided with a plurality of longitudinally spaced discharge openings 30. An offset clip or flange 32 is secured to the outer surface of the trough 14 adjacent each edge of the openings 30 with the clips or flanges 32 forming a channel like guide for slidably receiving a longitudinally slidable closure plate 34 which is transversely curved to conform to the shape of the cylindrical portion 16 of the trough 14. By varying the position of the plate 34 in relation to the discharge opening 30, the discharge of material through the opening may be regulated.

Each of the plates 34 is provided with a longitudinally extending sleeve 36 rigid therewith and the sleeve 36 receives an elongated actuating rod 38 with a setscrew 40 being disposed in the sleeve 36 for rigidly clamping the sleeve 36 to the rod 38 in adjusted position. This permits the rod 38 and the closure plate 34 to be adjusted relative to each other. For guiding the rod 38, sleeves 42 are provided on the trough 14 for guiding the longitudinal movement of the rod 38 when adjusting the closure plates 34.

The operating rod 38 extends longitudinally outwardly of the conveyor trough 14 and is pivotally attached to the lower end of an operating lever 44 by virtue of a pin and slot connection 46 whereby the rod 38 may slide longitudinally as urged by the pivotal movement of the operating lever 44. The operating handle or lever 44 is pivotally attached to a segmental quadrant or plate 48 by virtue of a pivot pin 50 with the quadrant 48 having notches 52 arranged arcuately about the upper edge thereof. The quadrant 48 is mounted on a bracket 54 and the lever 44 includes a release handle 56 for retracting a spring urged dog 58 from engagement with the notches 52 whereby the lever 44 may be pivoted to any position and locked in that position for retaining the discharge plates 34 in adjusted position.

It is pointed out that any suitable power means may be provided for rotating the screw auger 26 and such means may incorporate an electric motor connected to the screw auger 26 by virtue of a reduction gear mechanism. Also, an inclined plate or chute 60 is provided in underlying relation to the trough 14 for receiving discharge of the material from the openings 30 with the incline of the chute 60 being sufficient to cause the material to slide downwardly thereon for discharge laterally into a feed bunker 62 for distributing the material equally along the various feeding areas on a feed bunker thus evenly distributing the feed thereto. By individually adjusting the closure plates 34 in relation to the operating rod 38, the discharge of the material from each opening may be accurately adjusted for discharging equal amounts of material at each discharge opening.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A conveyor comprising an elongated trough of generally U-shaped configuration, an elongated screw auger rotatably mounted within said trough for conveying material longitudinally therein, said trough having a plurality of longitudinally spaced discharge openings disposed therein, a longitudinal slidable and transverse curved closure plate for each of said discharge openings, longitudinally extending guide flanges attached to the outer surface of the trough adjacent each edge of each opening for slidably mounting said closure plates on the outer surface of said trough, each of said closure plates including a longitudinally extending sleeve rigidly mounted on the outer surface thereof, an elongated operating rod extending through all of said sleeves, a set-screw in each sleeve adjustably securing each of said sleeves to said operating rod for independent adjustment of the closure plates in relation to the operating rod, guide sleeves on the outer surface of the trough for supporting said operating rod on said trough for longitudinal sliding movement, and an operating lever mounted at one end of said conveyor for moving said operating rod longitudinally thereby simultaneously opening and closing all of said closure plates.

References Cited in the file of this patent

UNITED STATES PATENTS

| | | |
|---|---|---|
| 1,180,470 | Carrillo | Apr. 25, 1916 |
| 1,202,376 | Fraser | Oct. 24, 1916 |
| 1,580,988 | Allstott | Apr. 13, 1926 |
| 2,576,941 | Ingalls | Dec. 4, 1951 |
| 2,646,023 | Virgil | July 21, 1953 |
| 2,826,344 | Weber | Mar. 11, 1958 |
| 2,835,420 | Foley | May 20, 1958 |